US012580486B2

(12) United States Patent　(10) Patent No.: US 12,580,486 B2
Liu et al.　(45) Date of Patent: Mar. 17, 2026

(54) TWO-OUTPUT CHARGING CIRCUIT AND METHOD FOR CONTROLLING ITS AUXILIARY CIRCUIT SWITCH

(71) Applicant: SHENZHEN VMAX NEW ENERGY CO., LTD., Shenzhen (CN)

(72) Inventors: Jun Liu, Shenzhen (CN); Yingying Feng, Shenzhen (CN); Shun Yao, Shenzhen (CN); Jinzhu Xu, Shenzhen (CN); Yuanzhao Zhang, Shenzhen (CN)

(73) Assignee: SHENZHEN VMAX NEW ENERGY CO., LTD., Shenzhen (CN)

( * ) Notice: Subject to any disclaimer, the term of this patent is extended or adjusted under 35 U.S.C. 154(b) by 694 days.

(21) Appl. No.: 17/993,009

(22) Filed: Nov. 23, 2022

(65) Prior Publication Data

US 2023/0091718 A1　Mar. 23, 2023

Related U.S. Application Data

(63) Continuation of application No. PCT/CN2020/134077, filed on Dec. 4, 2020.

(30) Foreign Application Priority Data

May 27, 2020　(CN) ......................... 202010464192.7

(51) Int. Cl.
H02M 3/335　(2006.01)
H02M 1/00　(2006.01)
(Continued)

(52) U.S. Cl.
CPC ....... H02M 3/33561 (2013.01); H02M 1/007 (2021.05); H02M 1/38 (2013.01);
(Continued)

(58) Field of Classification Search
CPC ........ H02M 1/007; H02M 1/009; H02M 1/38; H02M 1/40; H02M 3/01; H02M 3/33561; H02M 3/33569–33592
See application file for complete search history.

(56) References Cited

U.S. PATENT DOCUMENTS 5,481,449 A　1/1996　Kheraluwala et al.
2001/0030879 A1 *　10/2001　Greenfeld ......... H02M 3/33561
363/17

(Continued)

FOREIGN PATENT DOCUMENTS

CN　101895201 A　11/2010
CN　202218160 U　5/2012
(Continued)

OTHER PUBLICATIONS

Chinese Intellectual Property Office (ISR/CN), "International Search Report for PCT/CN2020/134077", China, Mar. 3, 2021.

*Primary Examiner* — Fred E Finch, III
(74) *Attorney, Agent, or Firm* — Troutman Pepper Locke LLP; Tim Tingkang Xia, Esq.

(57) ABSTRACT

The present invention discloses a two-output charging circuit and a method for controlling its auxiliary circuit switch. The two-output charging circuit includes two first-stage switch transistors in the half-bridge inverter circuit generating dead time at changing-over and turn-on, and the second-stage switch transistor being turned off within the dead time. In the present invention, making use of a magnetic core to return from the reverse in its bidirectional magnetization process generates dead time, and controlling the time sequence of the switch device of the post-circuit in the dead time abates the voltage stress of the synchronous rectifier diode and reduces the loss of the absorption circuit of the synchronous rectifier circuit.

17 Claims, 8 Drawing Sheets

(51) Int. Cl.
  *H02M 1/38*    (2007.01)
  *H02M 1/40*    (2007.01)
  *H02M 3/00*    (2006.01)

(52) U.S. Cl.
  CPC ......... *H02M 1/40* (2013.01); *H02M 3/33576*
     (2013.01); *H02M 3/01* (2021.05); *H02M*
             *3/33573* (2021.05)

(56)       References Cited

U.S. PATENT DOCUMENTS

| | | | |
|---|---|---|---|
| 2004/0090801 A1* | 5/2004 | Chen ................. | H02M 3/33592 |
| | | | 363/24 |
| 2017/0271993 A1* | 9/2017 | Jitaru ............... | H02M 3/33576 |
| 2019/0190394 A1* | 6/2019 | Jitaru ............... | H02M 3/33571 |
| 2019/0222050 A1* | 7/2019 | Liu ....................... | H02J 7/0071 |

FOREIGN PATENT DOCUMENTS

| | | | |
|---|---|---|---|
| CN | 107196517 A | 9/2017 |
| CN | 110198862 A | 9/2019 |
| CN | 110289667 A | 9/2019 |
| CN | 111490577 A | 8/2020 |
| CN | 212258468 U | 12/2020 |

\* cited by examiner

TWO-OUTPUT CHARGING CIRCUIT AND METHOD FOR CONTROLLING ITS AUXILIARY CIRCUIT SWITCH

CROSS-REFERENCE TO RELATED PATENT APPLICATION

This application is a continuation application of International Patent Application No. PCT/CN2020/134077, filed on Dec. 4, 2020, which itself claims priority to Chinese Patent Application No. CN202010464192.7 filed in China on May 27, 2020. The disclosures of the above applications are incorporated herein in their entireties by reference.

FIELD OF THE INVENTION

The present invention relates to the technical field of charging technology for electric vehicles, in particular to a two-output charging circuit and a method for controlling its auxiliary circuit switch.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The on-board charger generally has one AC input terminal and two DC output terminals, wherein the AC input terminal is connected to the mains network, and the first DC output terminal, which is equivalent to a main output circuit, is used to charge a high-voltage battery; the second DC output terminal, which is equivalent to an auxiliary output circuit, is used to supply energy to powered devices and low-voltage small batteries in a vehicle. During power output through these multiple ports integrated with traditional transformers, each output current must have a feedback mechanism and stable and controllable performance. The main circuit is directly controlled by feedback, and the auxiliary output circuit needs to be added with a second-switch regulator circuit besides a first-switch rectifier circuit.

However, no completion to drive in dead time in the prior art makes it necessary for the power device of the auxiliary output circuit to use a high-withstand-voltage device and increase the loss of a absorption circuit.

SUMMARY OF THE INVENTION

The present invention aims to provide a two-output charging circuit and a method for controlling its auxiliary circuit switch for the problems existing in the prior art, to solve the technical problem that the second-switch regulator circuit of two-output auxiliary circuit in the prior art finishes with its turnoff in the dead time of the main circuit, so as to effectively reduce the voltage stress of the power device of the auxiliary output circuit and improve the reliability of the circuit.

The present invention provides a method for controlling an auxiliary circuit switch of a two-output charging circuit, comprising the two-output charging circuit having a transformer, a primary input circuit positioned on the primary side of the transformer, and a main output circuit and an auxiliary output circuit positioned on the secondary side of the transformer; the primary input circuit being provided with a primary full-bridge inverter circuit, the main output circuit being provided with a main full-bridge inverter circuit, the auxiliary output circuit being provided with a half-bridge inverter circuit and a second-stage switch transistor functioning as a voltage regulator. The method for controlling an auxiliary circuit switch also comprises two first-stage switch transistors in the half-bridge inverter circuit generate dead time at changing-over and turn-on, and the second-stage switch transistor is turned off within the dead time.

In one embodiment of the present invention, the method further includes the turn-on frequency of the second-stage switch transistor being twice the switching frequency of the switch transistor in the main full-bridge inverter circuit while generating the dead time.

In the embodiment, the second-stage switch transistor completes a complete switching cycle when the two first-stage switch transistors are turned on respectively.

In the embodiment, when the two first-stage switching transistors are switched over and turned on, the magnetic induction intensity of the transformer reverses, the coil voltage of the auxiliary output circuit is commutated and the magnetic core of the transformer returns from the reverse, and the time for the magnetic core to return from the reverse is the dead time.

In the embodiment, at the time for the magnetic core to return from the reverse, the voltage across the auxiliary coil in the auxiliary output circuit is 0, and the current flowing at the turn-off of the second-stage switch transistor tends to 0.

In the embodiment, when the coil voltage of the auxiliary output circuit is commutated, the state of the switch transistor in the main full-bridge inverter circuit does not change.

In the embodiment, the turn-off edges of the two first-stage switch transistors are aligned with the turn-on/turn-off edge of the switch transistor in the main full-bridge inverter circuit.

In the embodiment, the voltage phase position of the auxiliary coil in the auxiliary output circuit is consistent with the voltage phase position of the main coil in the main output circuit.

In the embodiment, the on-off sequence of the switch transistor positioned on the crossed bridge arm in the primary full-bridge inverter circuit is consistent with that of the switch transistor positioned on the crossed bridge arm in the main full-bridge inverter circuit, and the phase position difference is 180°.

The present invention also provides a two-output charging circuit, comprising a primary input circuit, a main output circuit, an auxiliary output circuit and a control module, wherein the control module executes the method for controlling an auxiliary circuit switch according to the above.

Compared with the prior art, the present invention has the following beneficial effects:

1. Making use of a magnetic core to return from the reverse in its bidirectional magnetization process generates dead time, and controlling the time sequence of the switch device of the post-circuit in the dead time abates the voltage stress of the synchronous rectifier diode and reduces the loss of the absorption circuit of the synchronous rectifier circuit.

2. Compared with solutions such as using the high-withstand-voltage device and increasing the loss of the absorption circuit, the circuit and method according to the present invention is simple and reliable with low costs, and easy to control.

BRIEF DESCRIPTION OF THE DRAWINGS

Now, we shall describe the present invention in detail in combination with the examples and drawings as follows, where.

DETAILED DESCRIPTION OF EMBODIMENTS

We shall describe in detail the embodiments of the present invention as follows, examples of which are illustrated in the following drawings. Among them, an identical or similar symbol indicates an identical or similar component or has an identical or similar component. It is easy for a person skilled in the art to understand a common operation to circuits such as connecting a resistor to change adaptation to current/voltage, which is not to be described in the specific embodiment. The following examples described by reference to the drawings are illustrative and intended only to make an explanation for the present invention, rather than a limitation imposed on the present invention.

Figure 1:
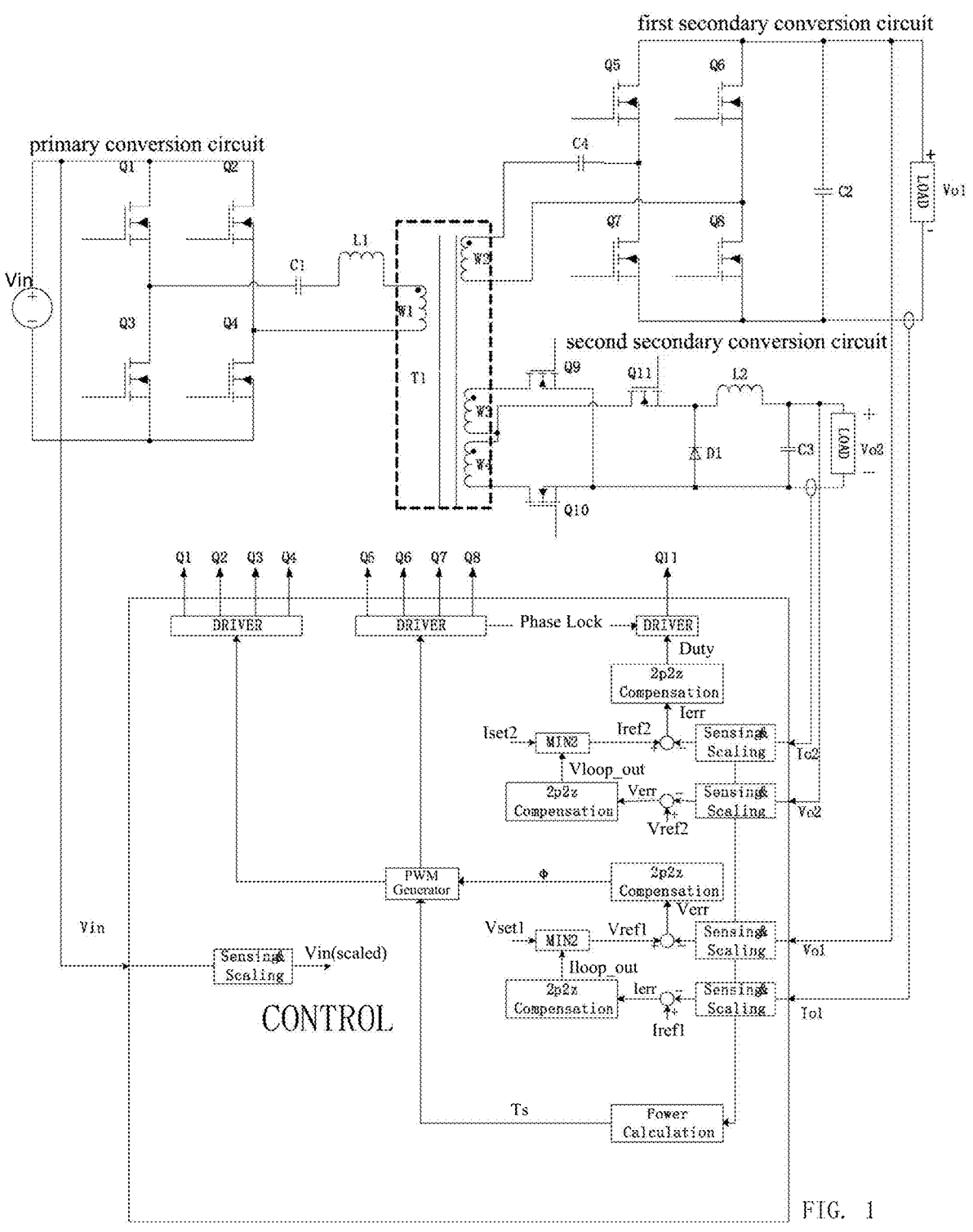
FIG. 1 shows the topography structure of the overall circuit.

FIG. 1 shows the topography structure of the overall circuit. The circuit includes a two-output circuit and a control module, wherein the control module controls the operation states of a primary input circuit, a main output circuit and an auxiliary output circuit in the two-output circuit, as more accurately described, the on-off states of the switch transistors in each circuit.

Figure 2:
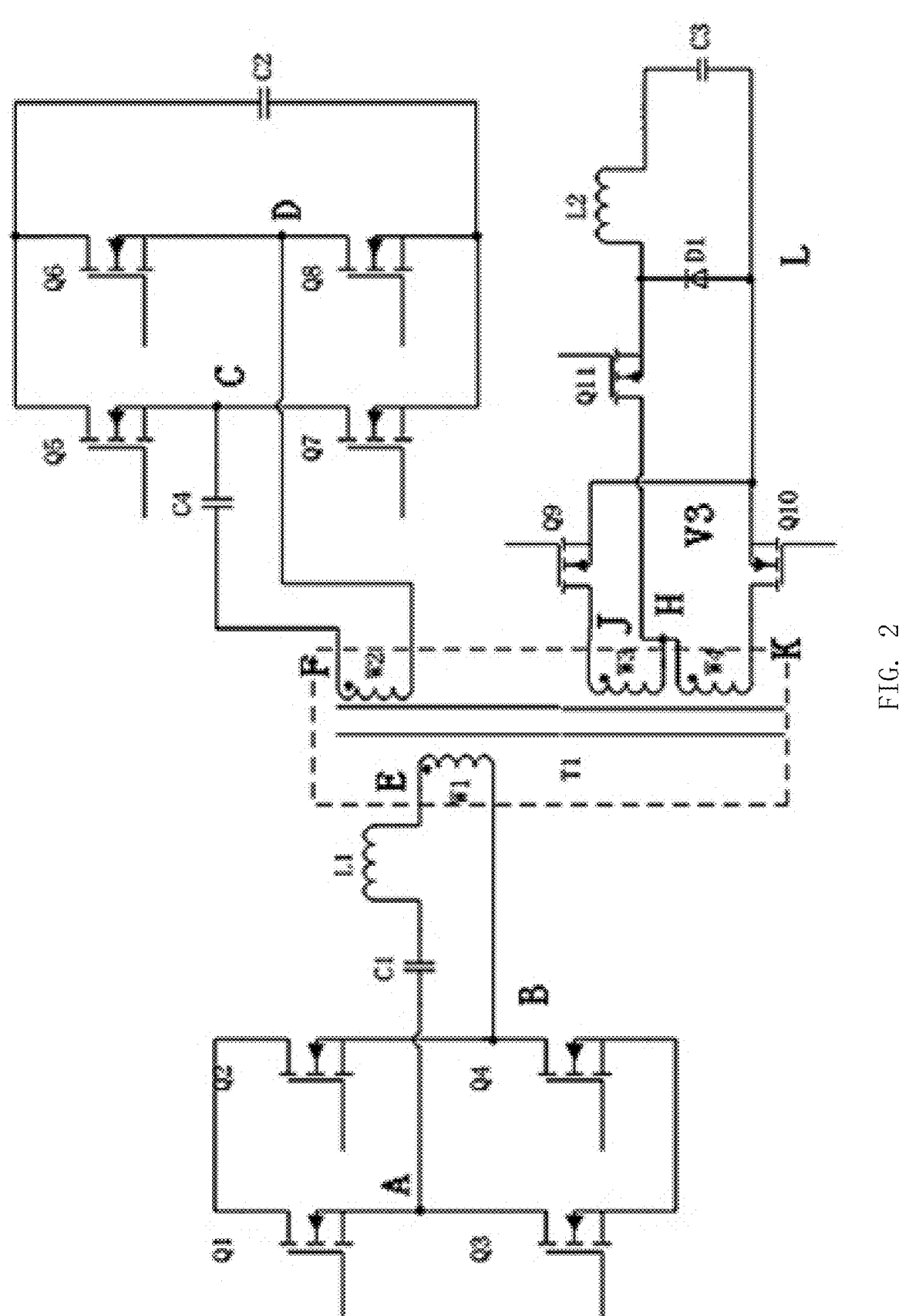
FIG. 2 shows the topography structure of the two-output circuit.

We shall describe in detail the two-output circuit as shown in FIG. 2, which includes a transformer, a primary input circuit, a first secondary conversion circuit, and a second secondary conversion circuit, wherein Q1, Q2, Q3 and Q4 are switch transistors of the primary input circuit, and the primary full-bridge inverter circuit includes Q1, Q2, Q3, and Q4; Q5, Q6, Q7 and Q8 are switch transistors of the first secondary conversion circuit; Q9, Q10, Q11 and D1 are switch transistors of the auxiliary circuit. C1 and L1 are a resonant capacitor and a resonant inductor of the PFC primary input circuit, respectively; C2 is a filter capacitor of the first secondary conversion circuit; L2 and C3 are an inductor and a capacitor of the second secondary conversion circuit, respectively; C4 is a resonant capacitor of the first secondary conversion circuit; T1 is a transformer; W1 is a coil of the primary input circuit; W2 is a coil of the first secondary conversion circuit; and W3 and W4 are a coil of the second secondary conversion circuit. Among them, L1 may be subject to the leakage inductance of T1; D1 may be an active control device such as a MOSFET.

Figure 3:
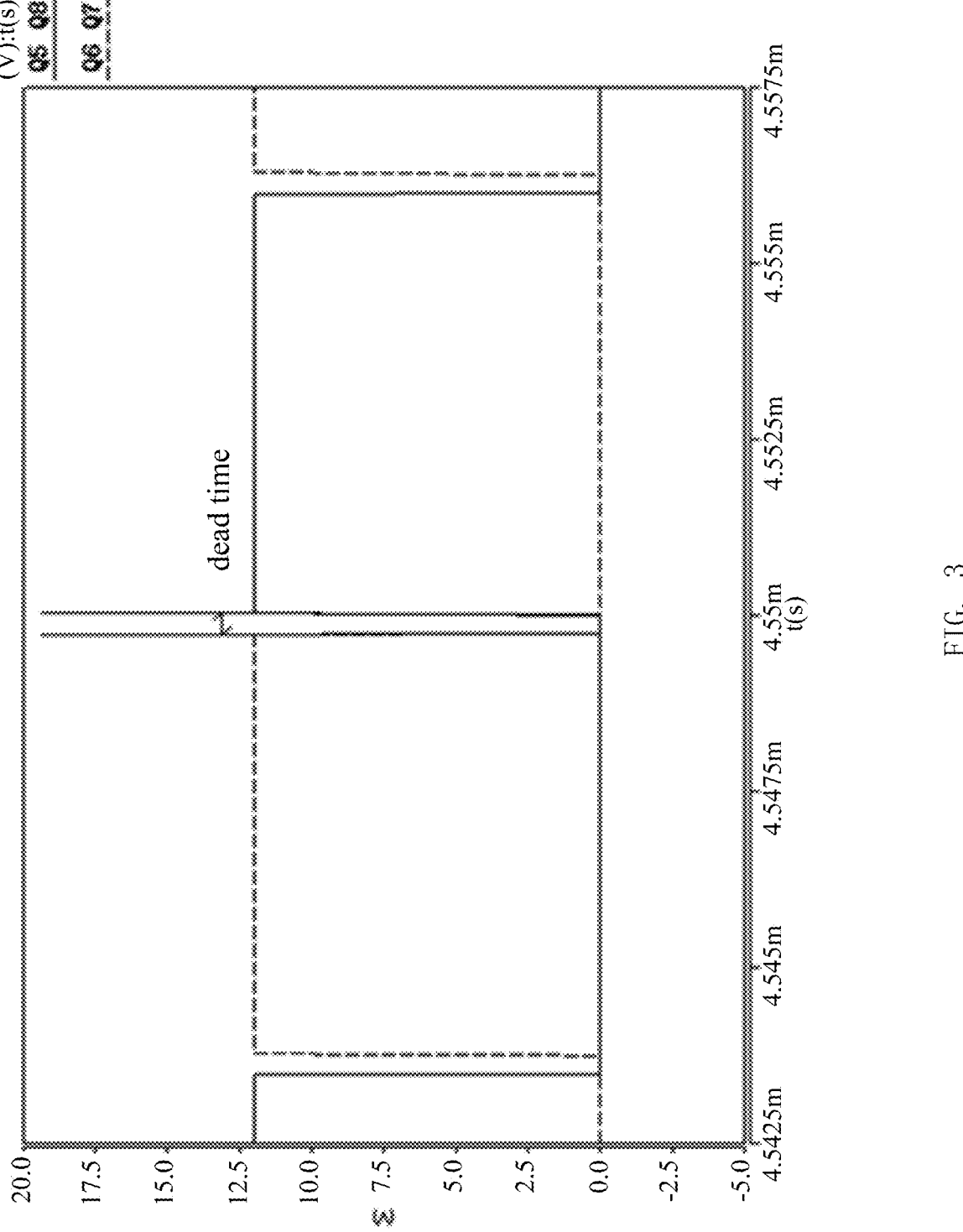
FIG. 3 shows turn-on states of the switch transistors Q5-Q10.

In one embodiment of the present invention, when the two-output circuit is in a charging state, the first secondary conversion circuit as a main output circuit includes Q5, Q6, Q7, Q8 and C4; the main full-bridge inverter circuit includes Q5, Q6, Q7 and Q8; the second secondary conversion circuit as an auxiliary output circuit includes Q9, Q10, Q11, D1 and L2; the half-bridge inverter circuit includes Q9, Q10, which are a first-stage switch transistor; and Q11 is a second-stage switch transistor. The output from the main circuit serves as main feedback, and the duty ratio of each Q1, Q2, Q3, Q4, Q5, Q6, Q7 and Q8 in the primary input circuit and the main output circuit is 50% minus the ratio of dead time to cycle time. In order to avoid a short circuit caused by turn-on simultaneous with switching of a pair of switch transistors positioned above and below the bridge arm, a time length of simultaneous turn-off, which is the dead time, is set to the upper switch transistor and the lower switch transistor, as shown in FIG. 3.

In one embodiment of the present invention, W1, W2, W3 and W4 are integrated in an identical magnetic core, when the main output circuit is operating, magnetic induction intensity exists in T1, and the induced voltage corresponding to the turns ratio of W2 in the main output circuit always exist in W3 and W4 in the auxiliary output circuit. The main output circuit is controlled in a mode that the main circuit always controls the duty ratio of the switch transistors in the main output circuit at 50% according to the input voltage of the primary input circuit and the voltage of the main output circuit. When the main output circuit is operating, the voltages of W3, W4, and W1 are clamped by the voltage of W2 and mapped onto the voltage of W2 according to the turns ratio. The voltages of W3 and W4 change with the voltage of the main output circuit. The stable and controllable output voltage and current of the auxiliary output circuit are realized by adding one switch regulator circuit to the auxiliary output circuit and forming the auxiliary output circuit with Q9, Q10, Q11, D1 and L2.

Figure 4:
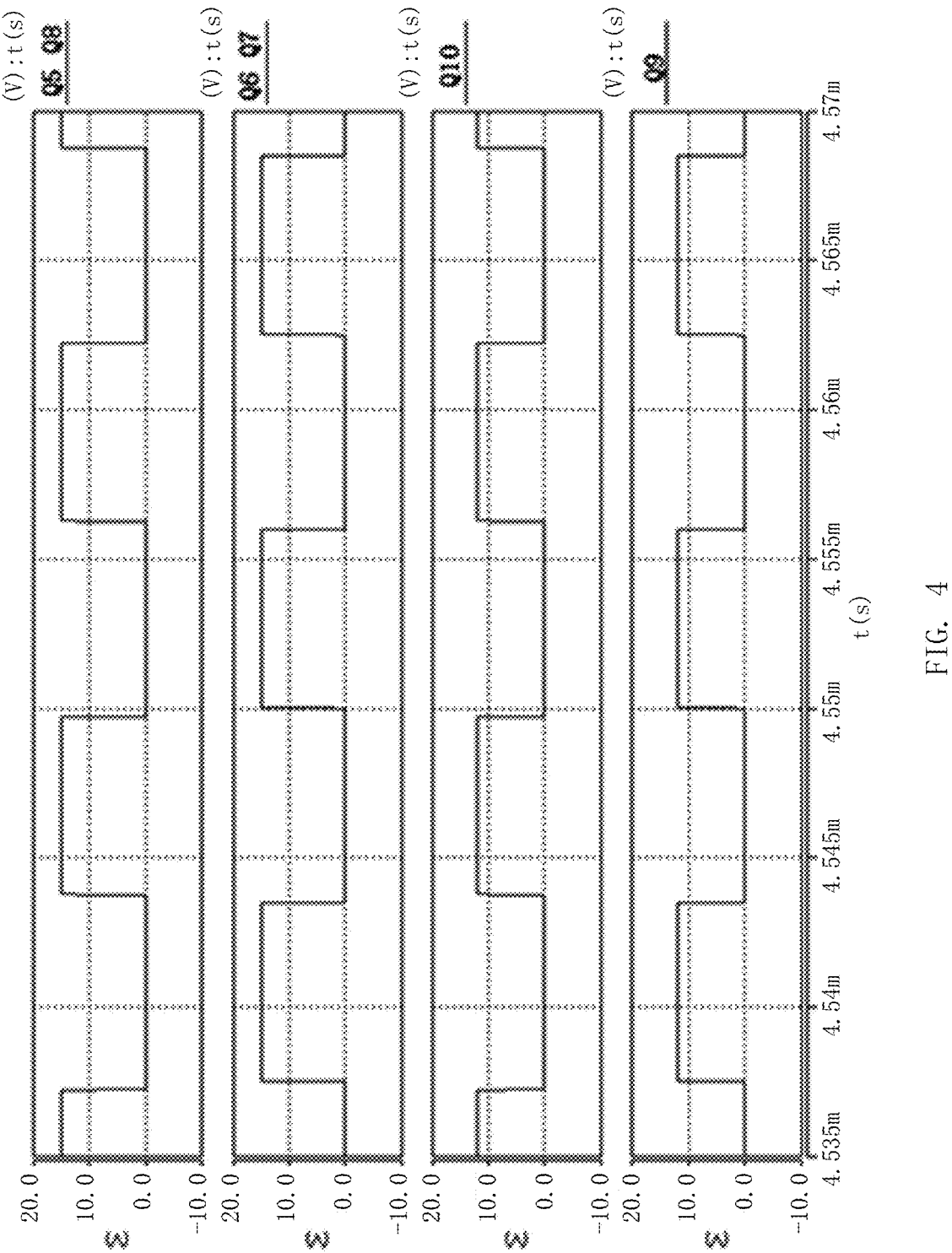
FIG. 4 shows the setting of the dead time.

In an embodiment of the present invention, Q5 and Q8 in the main output circuit are simultaneously turned on, each their turn-on time is 50% of the duty ratio minus the dead time, Q6 and Q7 are simultaneously turned on, their turn-on time are also 50% of the duty ratio minus the dead time. That is, the turn-on time of Q5, Q8 and Q6 and Q7 are all 50% of the duty ratio minus the dead time, so the phase position difference is 180°. The magnetic induction intensity exists on the same transformer, the phase position of the induced voltage existing on W3 and W4 are consistent with the phase position of the voltage on W2. The main output circuit is switched from the turn-on of Q5 and Q8 to the turn-on of Q6 and Q7, and the voltage on W2 is commutated, at the same time, the voltages of W3 and W4 are also commutated synchronously. The switching frequency and duty ratio of Q9 and Q10 are synchronous with those of the main output circuit. As shown in FIG. 4, Q10 is turned on when Q5 and Q8 are turned on in the main output circuit, and Q9 is turned on when Q6 and Q7 are turned on in the main output circuit. By this way, Q9 and Q10 function as a synchronous rectifier, so that Q9 and Q10 follow Q5, Q8 in the main output circuit; when Q6, Q7 are switched over, the transformer voltage is naturally commutated, and switched over and turned on autonomously. Among them, the auxiliary output circuit controls the duty ratio of Q11 by means of DSP detecting the feedback of the voltage of the auxiliary output circuit.

In an embodiment of the present invention, as shown in FIG. 2, the induced voltage on W3 and W4 is rectified by Q9 and Q10 to form a positive voltage V3 to L on H, 50% of the voltage V3 is derived from the coil W3, 50% comes from the coil W4. When the power loaded on the auxiliary output circuit is big, Q9 and Q10 used for synchronous rectification will generate a voltage stress peak at the moment of turn-off.

There are three sources of the stress peak: (1) the platform voltage during commutating the voltage of the transformer coil itself; (2) the platform voltage of the coil corresponding to the synchronous rectification at the other side; and (3) the induced voltage arising from the current change caused by the commutation of transformer voltage at the leakage inductance of the circuit. Among them, the sources (1) and (2) are related to the voltage of the main output circuit and the turns ratio of W2, W3 and W4, and in the condition that the leakage inductance is definite, they are related to the rate of current change.

Figure 5:
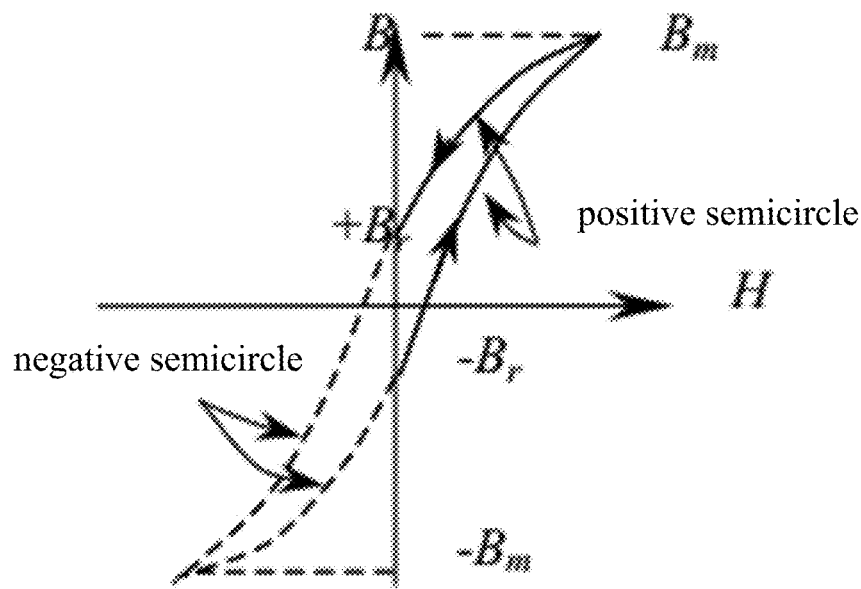
FIG. 5 shows the magnetic induction density change of the transformer and the bidirectional magnetization of the magnetic core.
Figure 6:
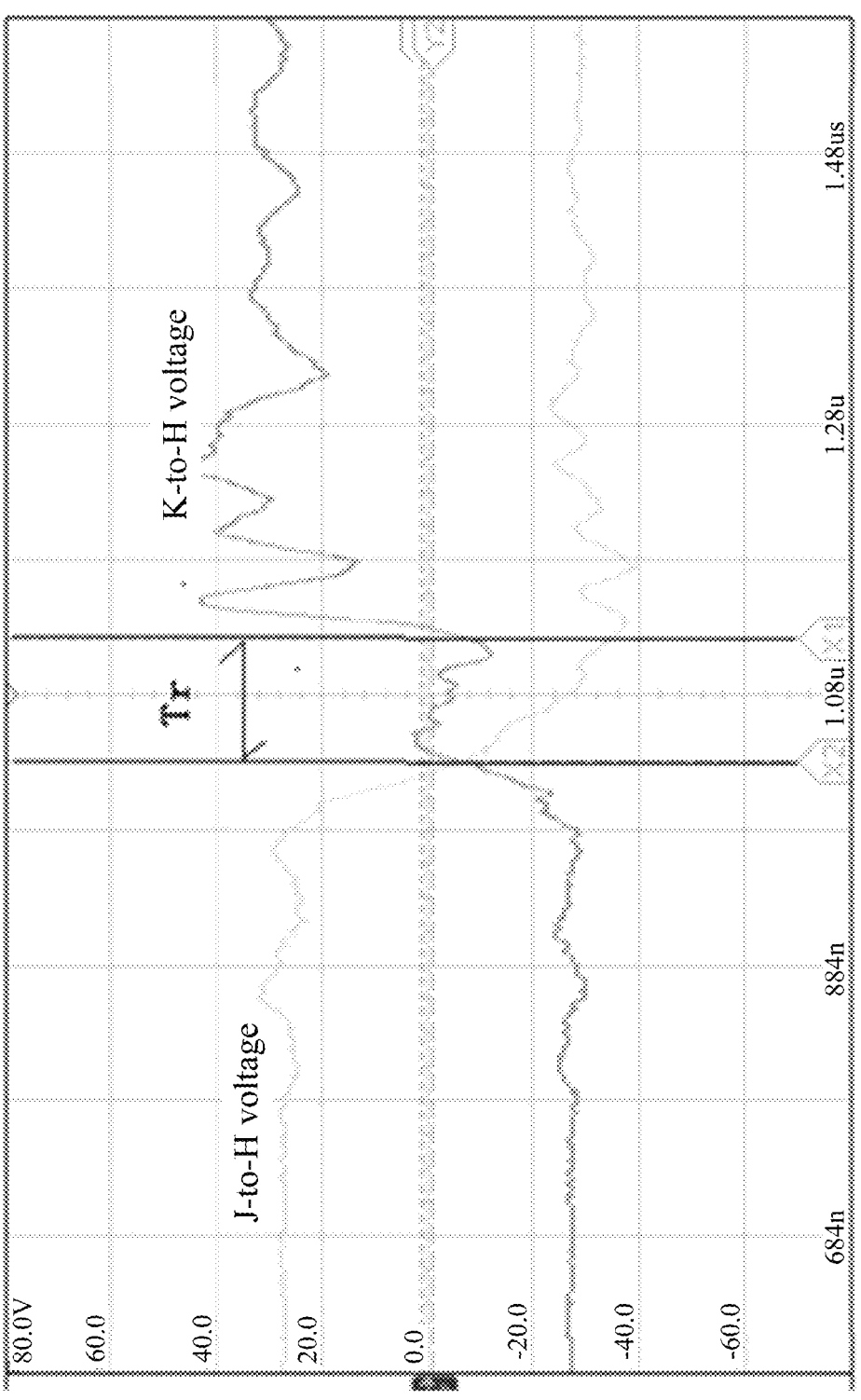
FIG. 6 shows the time for the transformer's voltage inversion to return from its reverse.
Figure 7:
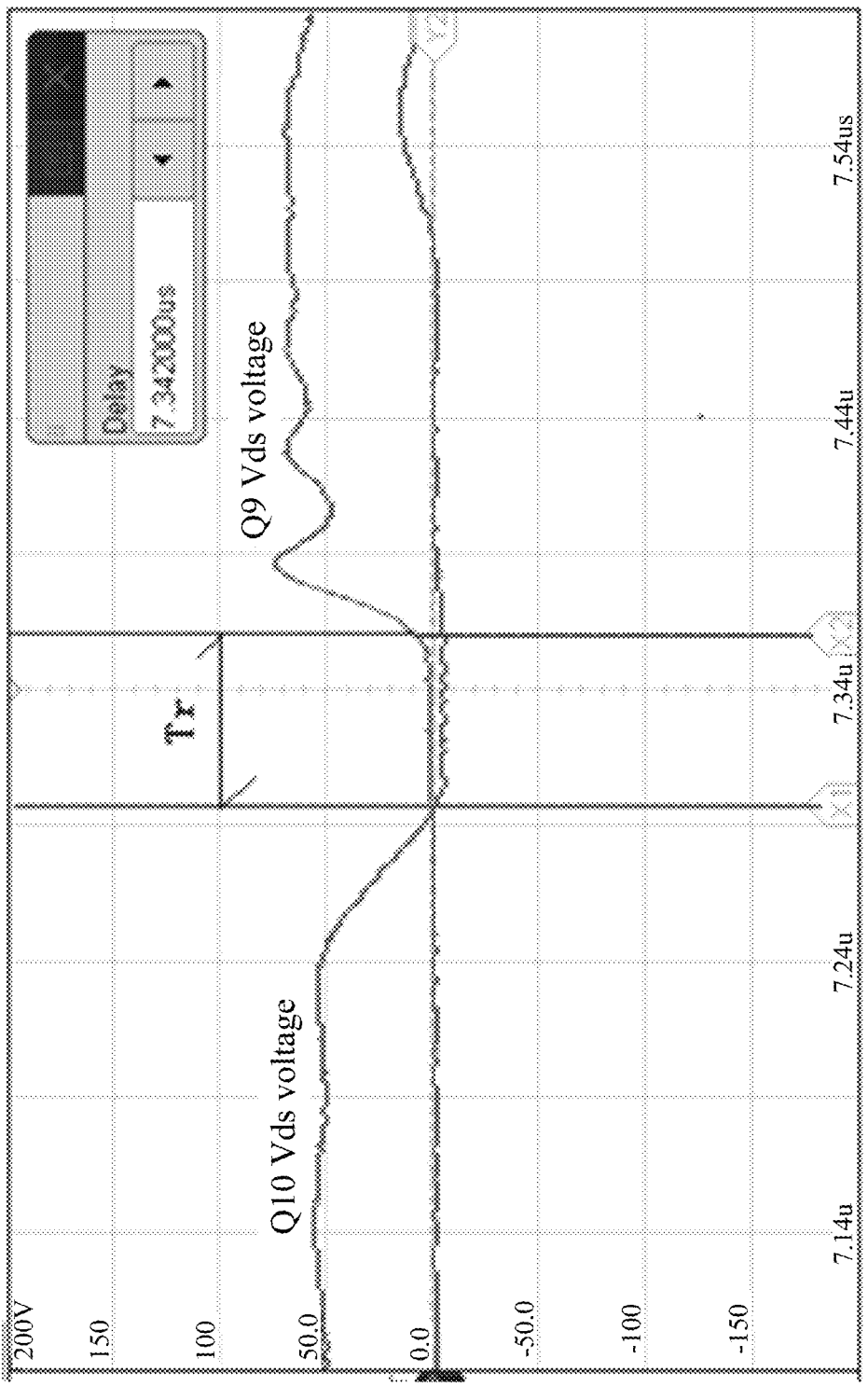
FIG. 7 shows the dead time of the switch transistors Q9 and Q10.

In an embodiment of the present invention, the topology structure is two-output, and the energy conversion is integrated in T1, and the voltage of W3 and W4 follows the voltage of W2. As shown in FIG. 2, when the voltage of W2 is switched from the turn-on of Q5 and Q8 to the turn-on of Q6 and Q7, that is, at its point D, the voltage VF of W2 is a plus vis-à-vis the voltage VD; when the voltage of W2 is switched over at point F, the voltage VF is a minus vis-à-vis the voltage VD, so the phase position difference there is 180°. The voltage phase position of W3 and W4 is consistent with the voltage phase position of W2, so the voltage VJ of W3 is also switched from a plus to a minus vis-à-vis VH, and the voltage VH of W4 is also switched from a plus to a minus vis-à-vis VK. As shown in FIG. 5, when the voltages of W3 and W4 are commutated, the magnetic induction intensity B of the transformer changes from +Bm to −Bm, the magnetic core is magnetized in bi-direction, and the inversion of magnetic induction intensity produces a reverse. A return from the reverse takes time, as shown in FIG. 6, representing that the transformer's voltage inversion needs time to return from the reverse. As shown in FIGS. 6 and 7, the time to return from the reverse is proportional to the magnitude of the magnetic induction intensity B, as the load on the auxiliary output circuit is augmented, the magnetic induction intensity B increases, and the auxiliary coil will take more time to make voltage conversion and commutation. The time for the magnetic core to return from the reverse is the dead time of Q9 and Q10 used for synchronous rectification in the auxiliary output circuit.

In an embodiment of the present invention, during the commutation of the coil voltage, the voltage across Q9, Q10 and the coil voltage for synchronous rectification synchronously rise. However, if Q11 is still turned on at commutation and continues to bring away energy from W3 and W4, it will cause two problems. (1) The current change rate on Q9 and Q10 will accelerate, that is, a big di/dt occurs, thus the di/dt will cause the leakage inductance on the line to generate a big induced voltage, as V=L*di/dt, so the voltage generated by leakage inductance overlying on the platform voltage of the coil can cause high voltage stress on Q9 and Q10 subject to synchronous rectification, at this time, it is necessary to enhance the absorption circuit to absorb this voltage stress. (2) When Q11 is turned off, the voltage of W3 or W4 is a stable voltage, the coil's load capacity is very strong, and the current at the turn-off of Q11 is very big; a big di/dt will also be generated across the switch transistor Q11, and the di/dt will cause a big voltage stress across Q11. (3) The voltage stress at the turn-off of Q11 will overlie across the synchronous rectifier diode, so that the synchronous rectification will also produce a high voltage peak when Q11 is turned off.

Figure 8:
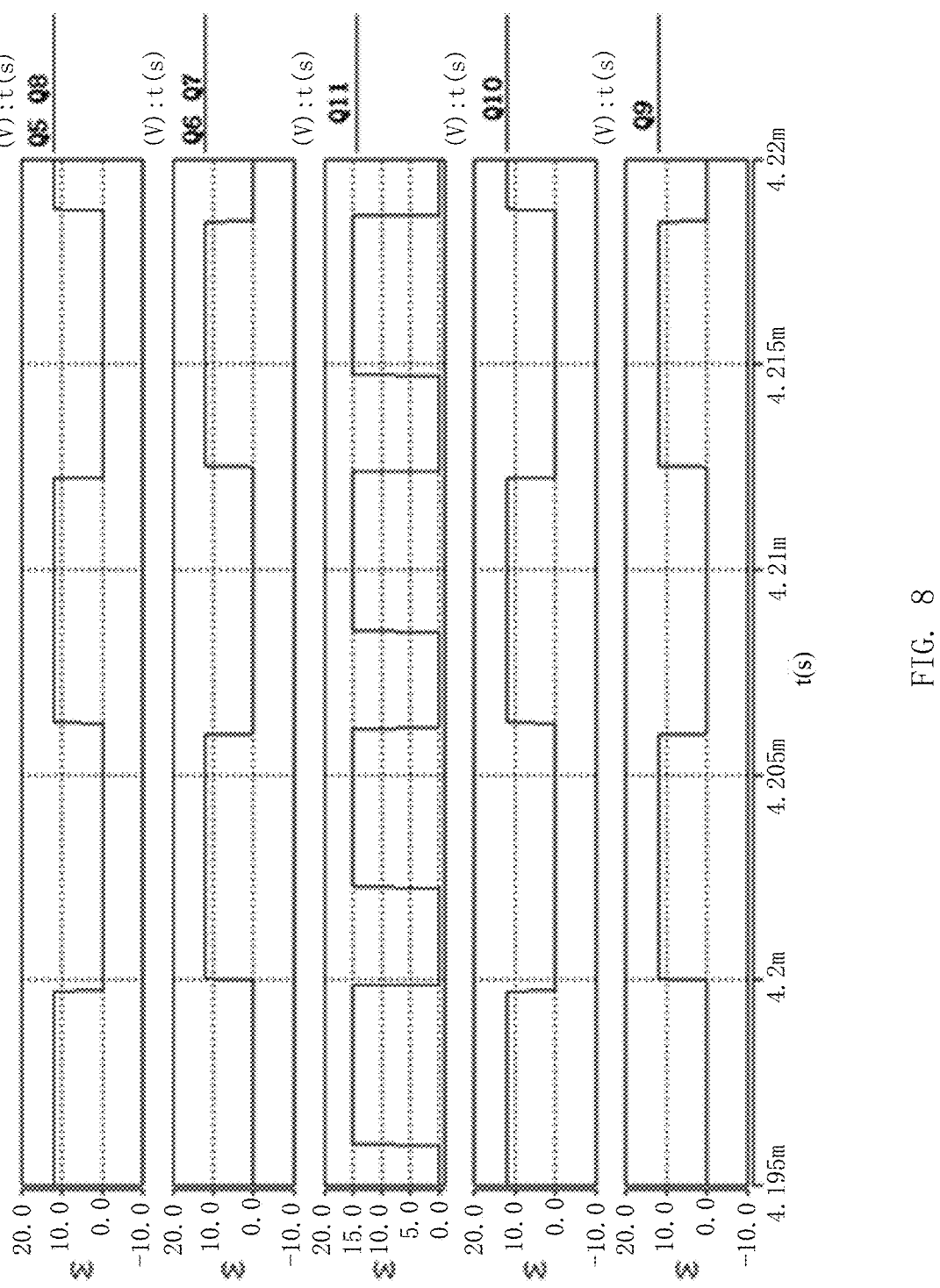
FIG. 8 shows the turn-off edge of the switch transistor Q11 aligned with the turn-off edges of the switch transistors Q5, Q6, Q7 and Q8 of the main output circuit.

The method for controlling an auxiliary circuit switch of a two-output charging circuit provided by the present invention is as follows.
   1. Using coil voltage for commutation, and using the magnetic core to return from the reverse to generate the dead time when Q9 and Q10 subject to synchronous rectification are switched over and turned on. At the same time, the turn-on frequency of Q11 controlled by DSP is twice the turn-on frequency of the main output circuit switch, and Q11 completes a full switching cycle at turn-on of Q10 and a full switching cycle at turn-on of Q9.
   2. Using turn-off of Q11 controlled by DSP during the dead time, as shown in FIG. 8, and aligning the turn-off edge of Q11 with the turn-off edge of Q5, Q6, Q7 and Q8 in the main output circuit.

While Q11 is being turned off in the dead time of Q9 and Q10, the transformer is commuted, and none of the switch transistors of the main output circuit is turned off/on, but W3 and W4 are in the return of the magnetic core from the reverse, the voltage across the coil is 0, the current flowing at the turn-off of Q11 is very small, and the voltage stress generated by hard switching across Q11 may greatly decrease. After turn-off of Q11, the current in the transformer coil of the auxiliary output circuit decreases because there is no load in the post-circuit, the voltage V=L*di/dt generated by the current change on the leakage inductance in the circuit greatly decreases, and the voltage stress at turn-off of Q9 and Q10 also greatly decreases, thereby reducing the loss of the absorption circuits of Q9 and Q10 and selecting switch transistors with lower voltage to reduce costs.

The forementioned description is only a specific embodiment of the present invention, so a person skilled in the art can make any change or modification to these embodiments, which should be included in the scope of the claims of the present invention, without departing from the principle and essence of the present invention.

What is claimed is:
1. A method for controlling an auxiliary circuit switch of a two-output charging circuit, comprising said two-output charging circuit having a transformer, a primary input circuit positioned on the primary side of said transformer, and a main output circuit and an auxiliary output circuit positioned on the secondary side of said transformer; said primary input circuit being provided with a primary full-bridge inverter circuit, said main output circuit being provided with a main full-bridge inverter circuit, said auxiliary output circuit being provided with a half-bridge inverter circuit and a second-stage switch transistor functioning as a voltage regulator,
   wherein two first-stage switch transistors in said half-bridge inverter circuit generate dead time at changing-over and turn-on, and said second-stage switch transistor is turned off within said dead time.
2. The method for controlling an auxiliary circuit switch of a two-output charging circuit according to claim 1, wherein said method further includes the turn-on frequency of said second-stage switch transistor being twice the switching frequency of the switch transistor in said main full-bridge inverter circuit while generating said dead time.
3. The method for controlling an auxiliary circuit switch of a two-output charging circuit according to claim 2, wherein said second-stage switch transistor completes a complete switching cycle when said two first-stage switch transistors are turned on respectively.
4. A two-output charging circuit, comprising a primary input circuit, a main output circuit, an auxiliary output circuit and a control module, wherein said control module executes said method for controlling an auxiliary circuit switch according to claim 3.

5. A two-output charging circuit, comprising a primary input circuit, a main output circuit, an auxiliary output circuit and a control module, wherein said control module executes said method for controlling an auxiliary circuit switch according to claim 2.

6. The method for controlling an auxiliary circuit switch of a two-output charging circuit according to claim 1, wherein when said two first-stage switching transistors are switched over and turned on, the magnetic induction intensity of said transformer reverses, the coil voltage of said auxiliary output circuit is commutated and the magnetic core of said transformer returns from the reverse, and the time for said magnetic core to return from the reverse is said dead time.

7. The method for controlling an auxiliary circuit switch of a two-output charging circuit according to claim 6, wherein at the time for said magnetic core to return from the reverse, the voltage across the auxiliary coil in said auxiliary output circuit is 0, and the current flowing at the turn-off of said second-stage switch transistor tends to 0.

8. A two-output charging circuit, comprising a primary input circuit, a main output circuit, an auxiliary output circuit and a control module, wherein said control module executes said method for controlling an auxiliary circuit switch according to claim 7.

9. The method for controlling an auxiliary circuit switch of a two-output charging circuit according to claim 6, wherein when the coil voltage of said auxiliary output circuit is commutated, the state of the switch transistor in said main full-bridge inverter circuit does not change.

10. A two-output charging circuit, comprising a primary input circuit, a main output circuit, an auxiliary output circuit and a control module, wherein said control module executes said method for controlling an auxiliary circuit switch according to claim 9.

11. A two-output charging circuit, comprising a primary input circuit, a main output circuit, an auxiliary output circuit and a control module, wherein said control module executes said method for controlling an auxiliary circuit switch according to claim 6.

12. The method for controlling an auxiliary circuit switch of a two-output charging circuit according to claim 1, wherein the turn-off edges of said two first-stage switch transistors are aligned with the turn-on/turn-off edge of the switch transistor in said main full-bridge inverter circuit.

13. A two-output charging circuit, comprising a primary input circuit, a main output circuit, an auxiliary output circuit and a control module, wherein said control module executes said method for controlling an auxiliary circuit switch according to claim 12.

14. The method for controlling an auxiliary circuit switch of a two-output charging circuit according to claim 1, wherein the voltage phase position of the auxiliary coil in said auxiliary output circuit is consistent with the voltage phase position of the main coil in said main output circuit.

15. A two-output charging circuit, comprising a primary input circuit, a main output circuit, an auxiliary output circuit and a control module, wherein said control module executes said method for controlling an auxiliary circuit switch according to claim 14.

16. The method for controlling an auxiliary circuit switch of a two-output charging circuit according to claim 1, wherein the on-off sequence of the switch transistor positioned on the crossed bridge arm in said primary full-bridge inverter circuit is consistent with that of the switch transistor positioned on the crossed bridge arm in said main full-bridge inverter circuit, and the phase position difference is 180°.

17. A two-output charging circuit, comprising a primary input circuit, a main output circuit, an auxiliary output circuit and a control module, wherein said control module executes said method for controlling an auxiliary circuit switch according to claim 1.

* * * * *